United States Patent [19] [11] 3,813,195
King [45] May 28, 1974

[54] INDUCTION SYSTEM FOR ROTARY MECHANISM
[75] Inventor: Robert W. King, Sidney, Ohio
[73] Assignee: Copeland Corporation, Sidney, Ohio
[22] Filed: Mar. 6, 1972
[21] Appl. No.: 231,863

[52] U.S. Cl. .................................. 418/86, 123/8.01
[51] Int. Cl. ....................... F01c 21/06, F02b 55/06
[58] Field of Search ........... 123/8.01, 8.45, 122 AA; 418/61, 83, 86

[56] References Cited
UNITED STATES PATENTS
3,180,323  4/1965  Paschke .......................... 418/61 X
3,373,722  3/1968  Zimmermann et al. ........... 123/8.45
3,424,135  1/1969  Tado ................................ 123/8.35
3,561,894  2/1971  King .................................... 418/86

Primary Examiner—William L. Freeh
Assistant Examiner—Michael Koczo, Jr.
Attorney, Agent, or Firm—Harness, Dickey & Pierce

[57] ABSTRACT

An induction system for a rotary piston machine in which a portion of the induction charge is passed through the rotary piston before induction into the chambers. The remainder of the intake charge is inducted directly into the chamber. This split induction system cools the rotary piston without undue heating of the total intake charge.

4 Claims, 6 Drawing Figures

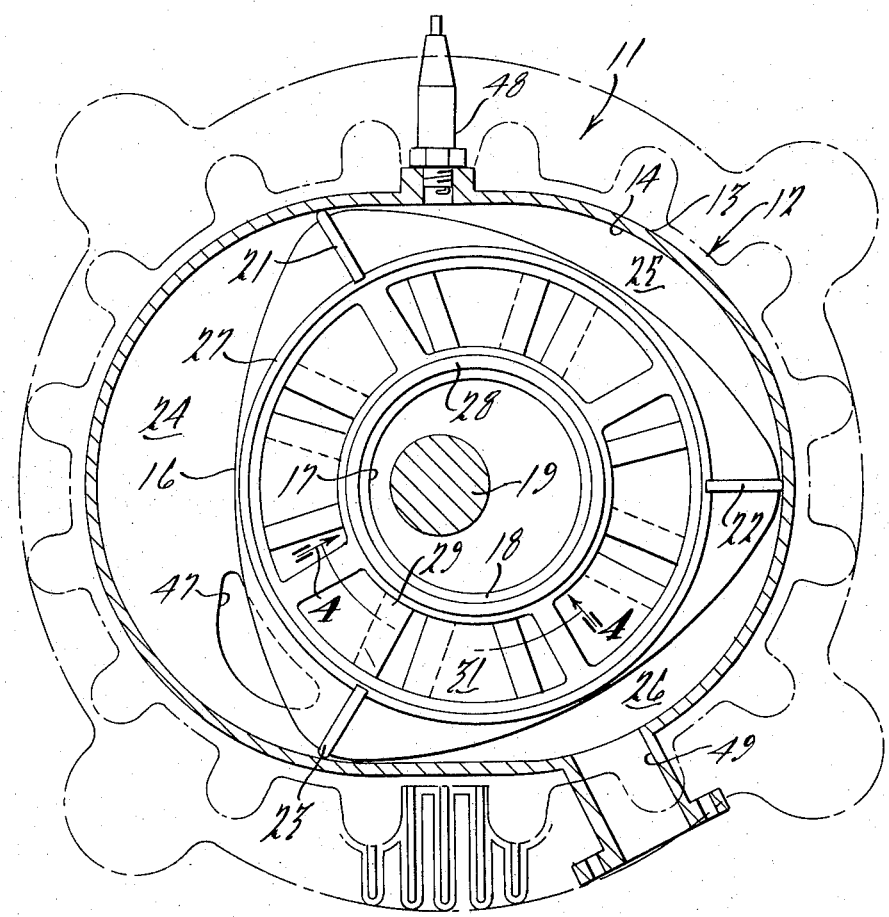
FIG. 1.
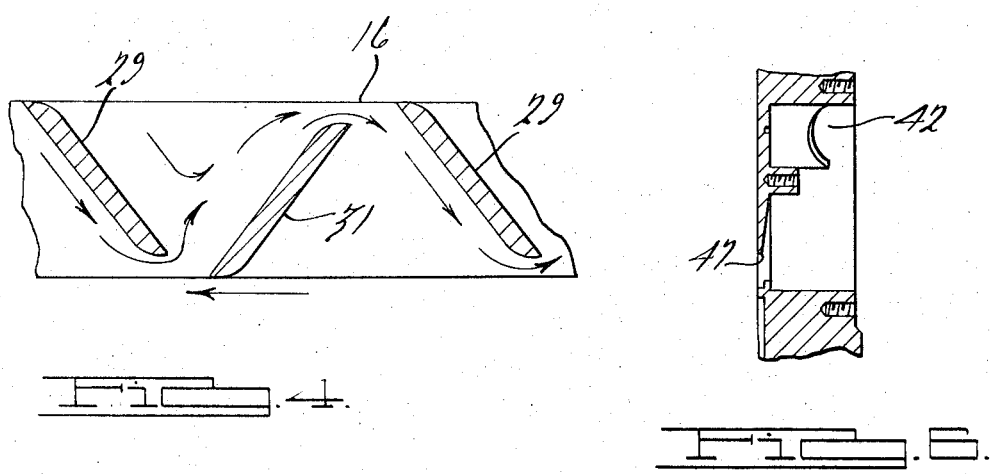
FIG. 4.
FIG. 5.

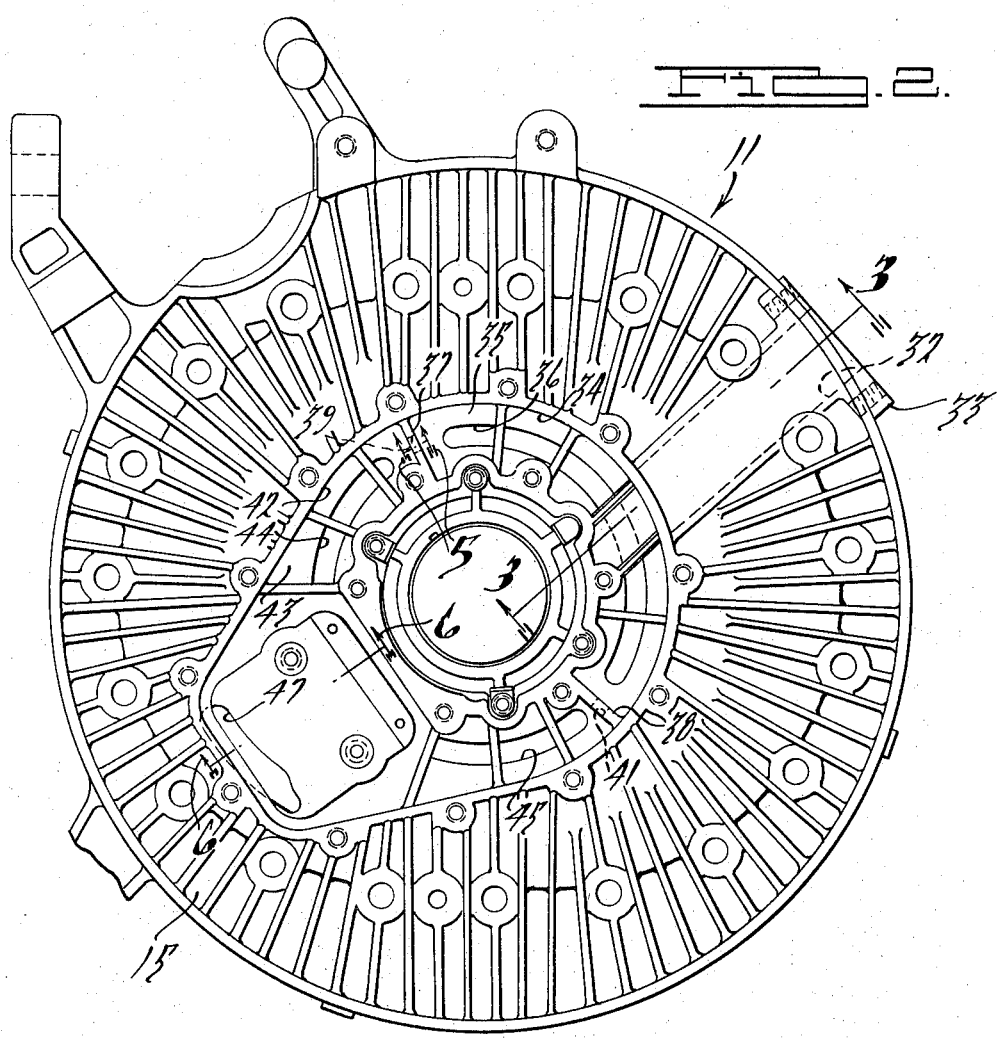
FIG. 2.
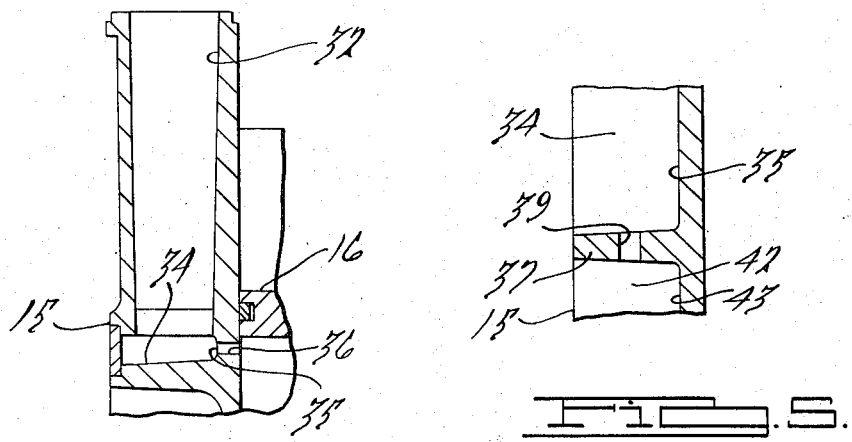
FIG. 3.
FIG. 5.

INDUCTION SYSTEM FOR ROTARY MECHANISM

BACKGROUND OF THE INVENTION

This invention relates to an induction system for a rotary piston machine and more particularly to a split induction system in which a portion of the intake charge is passed through the rotary piston.

In my U.S. Pat. No. 3,561,894, entitled "Intake Charge Cooling System For Rotary Machine," issued Feb. 9, 1971, I disclose a rotary piston internal combustion engine in which the induction charge flows through the rotor before introduction into the chambers of the engine. This arrangement provides cooling for the rotor. In some instances, however, the induction charge may be heated excessively and a loss of volumetric efficiency results.

It is, therefore, a principal object of this invention to provide an induction system for a rotary piston machine.

It is a further object of the invention to provide an induction system for this type of machine in which a portion of the intake charge flows through the rotor and another portion is inducted directly into the chambers of the mechanism.

It is a further object of this invention to provide an improved intake charge cooling system for a rotary piston machine that avoids excess heating of the intake charge.

SUMMARY OF THE INVENTION

This invention is adapted to be embodied in a rotary piston machine. Such a machine includes an outer housing that defines a lobed cavity in which a lobed piston is supported. The piston has a different number of lobes than the cavity and defines at least two chambers with the cavity. Means support the piston and housing for relative rotation for cyclically varying the volume of the chambers. Intake means are provided for delivering a charge to the chambers. The intake means defines a first path that extends at least in part through the rotor and a second path that does not extend through the rotor.

BRIEF DESCRIPTION OF THE DRAWINGS

FIG. 1 is a cross sectional view taken through the axis of a rotary piston internal combustion engine embodying this invention.

FIG. 2 is an elevational view of the engine, with portions removed to more clearly show the induction system.

FIG. 3 is a cross sectional view taken along the line 3—3 of FIG. 2.

FIG. 4 is a cross sectional view taken along the line 4—4 of FIG. 1 and shows the air flow path through the rotary piston.

FIG. 5 is a cross sectional view taken along the line 5—5 of FIG. 2.

FIG. 6 is a cross sectional view taken along the line 6—6 of FIG. 2.

DETAILED DESCRIPTION OF THE PREFERRED EMBODIMENT

In the drawings a rotary piston internal combustion engine embodying this invention is identified generally by the reference numeral 11. It is to be understood that, although the invention is described in conjunction with an engine, it has utility in other applications of such mechanisms. That is, the invention may find utility in connection with rotary piston compressors, pumps and the like. The invention does, however, have particular utility in conjunction with an internal combustion engine, for reasons which will become apparent.

The engine 11 is comprised of an outer housing assembly, indicated generally by the reference numeral 12. The outer housing assembly 12 includes a peripheral wall 13 defining a lobed cavity 14. The opposite sides of the cavity 14 are closed by end plates, only one of which appears in the drawings and is identified by the reference numeral 15.

A lobed rotary piston 16 is positioned within the cavity 14 and has a cylindrical surface 17 that is journalled upon an eccentric 18 of an output shaft 19. As is well known with this type of mechanism, timing gears (not shown) are provided on the outer housing 12 and rotary piston 16 so as to time the relative movement between these members.

The piston 16 has three lobes or apices that carry apex seals 21, 22 and 23. The apex seals sealingly engage the outer housing surface that defines the cavity 14. The cavity defined by the outer housing is, therefore, divided into three chambers 24, 25 and 26.

A compression seal 27 is formed at the outer periphery of each side of the piston 16 and cooperates with the apex seals 21, 22 and 23 and with the end plates 15 in any known manner so as to further complete the sealing of the chambers 24, 25 and 26. In addition, an oil seal 28 is provided on each face of the piston 16 adjacent the eccentric 18 to provide oil sealing. Between the seals 27 and 28 the rotary piston 16 is formed with a generally annular air gap that is spanned by pairs of vanes 29 and 31. The vanes 29 extend from one end face of the rotary piston 16 at an angle and terminates short of the opposite end face (FIG. 4). The vanes 31 extend at a complementary angle from the other end face and terminates short of the first end face. Thus, the vanes 29 and 31 define an air flow path through the periphery of the rotor as indicated by the arrows 4 and for a reason which will become more apparent as this description proceeds.

An induction system is provided for introducing a charge sequentially to each of the chambers 24, 25 and 26. This induction system includes a primary intake passage 32 (FIG. 2) formed in the end plate 15 and extending from a flange 33 that is adapted to mount a carburetor or other charge forming device. The primary passage 32 intersects the annular chamber 34 formed in the end wall 15. The outer face of the chamber 34 is adapted to be closed by an end plate (not shown) as described in my aforenoted patent. The chamber 34 is bounded by an end wall 35 that is juxtaposed to the adjacent surface of the rotary piston 16. The end wall 35 is formed with a generally circular slot 36 that permits the flow of intake charge from the chamber 34 into the hollow interior of the rotary piston 16. The slot 36 is always positioned between the seals 27 and 28 of the rotary piston 16 so that there will always be registry between the slot 36 and the area encompassed by the vanes 29 and 31.

The opposite ends of the chamber 34 are bounded by generally radially extending walls 37 and 38. In my aforenoted patent these end walls are imperforated so that all of the intake charge must flow through the rotary piston 16. In this invention, however, accurately sized openings 39 and 41 are formed in the walls 37 and 38, respectively. These openings permit a portion of the intake charge to flow from the chamber 34 into a second chamber 42. The chamber 42 is also defined by a wall 43 that extends immediately adjacent the one side of the rotary piston 16. A pair of circular slots 44 and 45 extend through the wall 43 into registry with the portion of the piston 16 between the seals 27 and 28. In addition, an intake port 47 extends through the end plate 15 and into the cavity 14 of the outer housing 12.

In operation, the planetating rotary movement of the piston 16 within the outer housing 12 will cause the chambers 24, 25 and 26 to sequentially expand and contract in volume. This movement and action causes a negative pressure to exist at the intake port 47. This negative pressure causes air to be drawn in to the chamber through the induction system in the paths now to be described.

A portion of the intake charge that flows through the primary induction passage 32 will, as has been noted, flow into the hollow interior of the piston 16 through the slot 36. This portion of the charge enters the rotary piston 16 at a point that is approximately diametrically opposed to the intake port 47. This charge will first be directed from the end wall 15 toward the opposite end wall by the vanes 31. Since the opposite end wall is imperforate, the vanes 29 will redirect the flow of the intake charge back to the end plate 15. This portion of the intake charge will then flow through the slots 44 and 45 into the chamber 42. The charge then is transferred through the intake port 47 into the respective chambers 24, 25 and 26 of the engine 11.

Simultaneously with the aforenoted flow, a portion of the intake charge will pass through the openings 39 and 41 in the walls 37 and 38. This portion of the charge bypasses the flow that occurs through the rotary piston 16 directly enters the chambers 24, 25 and 26 after passing through the chamber 42 and through the port 47.

The portion of the intake charge that passes through the rotary piston 16 will cool this piston and will, therefore, be heated. This heated charge is mixed with the direct charge, which is not heated to any significant extent, and thus the volumetric efficiency is improved since the total charge that enters the chambers 24, 25 and 26 is at a lower temperature than the portion of the charge that has flown through the rotary piston 16.

After the charge has been delivered to the respective chamber it is fired by a spark plug 48 and is permitted to expand. The expanded burnt charge is then exhausted through an exhaust port 49 formed in the peripheral wall 14 of the outer housing 12. It is believed apparent to those skilled in the art that the chambers 24, 25 and 26 sequentially undergo the four cycles of the four cycle internal combustion engine process. The chamber 24, as illustrated in FIG. 1, is still expanding in volume and is drawing an intake charge through the port 47 through the split flow path described. Compression will next occur and the compressed charge will be fired by the spark plug 48. The chamber 25 is undergoing the expansion or power stroke and the chamber 26 has completed its expansion and is on its exhaust cycle.

As has been noted, the split induction system disclosed herein may find utility in other applications for the rotary piston mechanism. That is, it may be used in conjunction with a diesel cycle, a two cycle operation or in conjunction with the use of this mechanism as a pump or compressor. Furthermore, the proportion of flow that passes through the rotary piston 16 in relation to that that flows directly into the chambers may be altered by changing the size of the openings 39 and 41. The ratio may also be changed during operation through the use of suitable valves, which may be manually or automatically controlled. Various other changes and modifications may be made without departing from the spirit and scope of the invention, as defined by the appended claims.

I claim:

1. A rotary piston machine comprising an outer housing defining a lobed cavity, a lobed piston supported within said cavity, said piston having a different number of lobes than said cavity and defining at least two chambers therewith, means supporting said piston and said housing for relative rotation for cyclically varying the volumes of said chambers, and intake means for delivering a charge to said chambers, said intake means comprising an intake port formed in said outer housing and means defining a first path extending at least in part through said piston and terminating at said intake port and a second path that does not extend through said piston and which terminates at said intake port, the charge flowing through said first and said second paths both entering said chambers through said intake port.

2. A rotary piston machine as set forth in claim 1 wherein the means defining the flow paths includes a dividing wall for separating the two flow paths and an opening in said dividing wall of predetermined flow area.

3. A rotary piston machine as set forth in claim 1 wherein the first path extends from one end face of the piston through said piston to its opposite end face and back to said one face for induction to said chambers.

4. A rotary piston mechanism comprising an outer housing defining a lobed cavity, a lobed piston supported within said cavity, said piston having a different number of lobes than said cavity and defining at least two chambers therewith, means supporting said piston and said housing for relative rotation for cyclically varying the volumes of said chambers, and intake means for delivering a charge to said chambers, said intake means comprising a first passage extending through said housing and registering with one end face of said piston, said piston having an opening therein adapted to receive a charge from said first passage, a second passage formed in said housing in registry with said one end face of said piston for receiving a charge from said piston opening, an intake port extending from said second passage into the cavity of said outer housing for delivering a charge to said chambers, and means providing direct communication between said first passage and said second passage for delivering a portion of said intake charge from said first passage to said second passage and into said chambers through said intake port without said charge having passed through said piston opening.

* * * * *